(12) United States Patent
Kesten et al.

(10) Patent No.: US 7,758,671 B2
(45) Date of Patent: Jul. 20, 2010

(54) VERSATILE DEHUMIDIFICATION PROCESS AND APPARATUS

(75) Inventors: Arthur S. Kesten, West Hartford, CT (US); Jack N. Blechner, West Hartford, CT (US)

(73) Assignee: Nanocap Technologies, LLC, West Hartford, CT (US)

( * ) Notice: Subject to any disclaimer, the term of this patent is extended or adjusted under 35 U.S.C. 154(b) by 812 days.

(21) Appl. No.: 11/503,712

(22) Filed: Aug. 14, 2006

(65) Prior Publication Data

US 2008/0034966 A1    Feb. 14, 2008

(51) Int. Cl.
*B01D 53/22* (2006.01)
*B01D 59/12* (2006.01)

(52) U.S. Cl. .................. 95/46; 95/43; 95/45; 95/52; 96/4; 96/10

(58) Field of Classification Search .......... 95/43, 95/45, 52, 46; 96/4, 10
See application file for complete search history.

(56) References Cited

U.S. PATENT DOCUMENTS

| | | | | |
|---|---|---|---|---|
| 2,433,741 | A | * 12/1947 | Crawford | 95/52 |
| 4,100,331 | A | * 7/1978 | Fletcher et al. | 429/13 |
| 4,209,368 | A | * 6/1980 | Coker et al. | 205/525 |
| 4,239,507 | A | * 12/1980 | Benoit et al. | 95/48 |
| 4,583,996 | A | * 4/1986 | Sakata et al. | 95/50 |
| 4,900,448 | A | 2/1990 | Bonne et al. | 210/637 |
| 5,528,905 | A | 6/1996 | Scarlatti | 62/3.4 |
| 5,595,690 | A | 1/1997 | Filburn et al. | 261/104 |
| 5,605,628 | A | * 2/1997 | Davidson et al. | 210/321.83 |

(Continued)

FOREIGN PATENT DOCUMENTS

EP    678321 A2 * 10/1995

OTHER PUBLICATIONS

The American Heritage Dictionary of the English Language: Fourth Edition 2000.*

(Continued)

*Primary Examiner*—Jason M Greene
*Assistant Examiner*—Anthony Shumate
(74) *Attorney, Agent, or Firm*—O'Shea Getz P.C.

(57) ABSTRACT

A process and apparatus for dehumidifying a gas stream is provided. The apparatus includes a single semi-permeable osmotic membrane, at least one gas stream compartment formed in part by the osmotic membrane, and at least one osmotic fluid compartment formed in part by the osmotic membrane. The semi-permeable osmotic membrane has randomly arranged pores disposed across a thickness extending between a first side and a second side, and wherein some of the pores are small enough to permit capillary condensation within the membrane, leading to condensate travel across the thickness of the single membrane without requiring a separate capillary condenser, and which single membrane restricts transport of the osmotic fluid across the thickness of the membrane. The first side of the osmotic membrane is exposed to the gas stream compartment, and the second side of the osmotic membrane is exposed to the osmotic fluid compartment.

4 Claims, 3 Drawing Sheets

U.S. PATENT DOCUMENTS

| | | | |
|---|---|---|---|
| 5,928,808 A * | 7/1999 | Eshraghi | 429/41 |
| 6,539,731 B2 | 4/2003 | Kesten et al. | 62/93 |
| 6,766,817 B2 | 7/2004 | da Silva | |
| 6,918,404 B2 | 7/2005 | da Silva | |
| 7,066,586 B2 | 6/2006 | da Silva | |
| 2001/0015500 A1 * | 8/2001 | Shimanuki et al. | 261/104 |
| 2002/0098395 A1 * | 7/2002 | Shimanuki et al. | 429/13 |
| 2002/0104439 A1 * | 8/2002 | Komkova et al. | 96/4 |
| 2002/0139245 A1 | 10/2002 | Kesten et al. | 95/52 |
| 2002/0139320 A1 * | 10/2002 | Shimanuki et al. | 122/362 |

OTHER PUBLICATIONS

Eijkel et al. (Water in micro- and nanofluidics systems described using the water potential) This journal is The Royal Society of Chemistry, Sep. 29, 2005 Lab Chip, 2005, 5, 1202-1209.*

Yan et al. (Proton exchange membrane with hydrophilic capillaries for elevated temperature PEM fuel cells) Electrochemistry Communications 11 (2009) 71-74.*

Eijkel et al. (Osmosis and pervaporation in polyimide submicron microfluidic channel structures) Applied Physics Letters 87, 114103 2005.*

* cited by examiner

VERSATILE DEHUMIDIFICATION PROCESS AND APPARATUS

TECHNICAL FIELD

This invention relates to processes and apparatus for conditioning a gas stream, such as air, and to the dehumidification of a gas stream in particular.

BACKGROUND ART

Conditioning of a gas stream, such as air, generally involves the removal or addition of moisture and the increase or decrease of temperature to make the gas stream suitable for its intended environment. For air conditioning in warm weather, this typically involves dehumidifying and cooling the air to comfortable levels.

Current dehumidification technology is commonly based on the conventional, refrigerant vapor compression cycle (hereinafter referred to as DX technology) or on desiccant substrate capture technology (hereinafter referred to as DS technology). DX technology requires cooling humid supply air, such as the air within a room and/or outside air, to the water vapor condensation point, with external heat rejection on the compression side. This usually requires the supply air to be cooled below comfortable temperatures and, thereafter, either reheated or mixed with warmer air to raise its temperature to an acceptable level before directing it into the space being dehumidified. Twenty to thirty-five percent (20-35%) of the energy expended in cooling the high humidity air is utilized to remove the latent heat from the air (the heat of condensation associated with water vapor condensation). Cooling and dehumidification of the air are thus coupled. That makes it impossible to independently control comfort parameters, making the DX cycle less efficient, from an overall system perspective, than a technology that would allow independent control of sensible and latent heat.

In applications where the outside air has both high humidity and temperature and the functional use of the interior space generates high water vapor levels (e.g., populated convention halls, exercise rooms, school buildings, etc.), it may not be possible for the DX technology to maintain the air introduced into the interior space at the correct humidity and temperature for maintaining comfort. The air delivered is cool but "muggy", since further cooling to remove additional water would result in the air being uncomfortably cool.

In stand-alone dehumidification using a conventional compression cycle, heat reject is in direct contact with the room air. As a consequence, the room air becomes more comfortable from a humidity side, but may be less comfortable (too warm) from a temperature parameter consideration. Again the comfort parameters are coupled.

DS systems are generally applied in central air, ducted systems. Water vapor is captured by capillary condensation on a solid phase substrate containing pores of the appropriate size (typically less than 100 Angstroms) to cause capillary condensation. The capture process is efficient and rapid. However, removal of the water vapor from the pores, wherein the intrinsic vapor pressure of the water is lowered in correspondence with the Kelvin equation, requires energy input. It also requires removing the substrate from the high humidity air stream and placing it in an exhaust, water reject stream, before adding the re-evaporation energy. Alternatively, the substrate may remain fixed and the treated air and exhaust streams flow directions interchanged as is done in a parallel bed, desiccant drier system.

In these DS systems, the re-evaporation energy is the latent heat of condensation plus the heat of adsorption of the water vapor in the substrate pore material. It is important to note that DS technology requires, in steady state operation, the addition of this energy at a rate equal to or greater than the latent heat of condensation of water in the desiccant substrate. That is, the water vapor reject power input must exceed the equivalent latent heat of condensation power. After water removal from the desiccant substrate, the substrate must be re-cooled to the water capture temperature range of the substrate. As a consequence, some of the sensible heat of the subsequent cooling system (e.g., a DX cooling system) must be utilized in treating the DS substrate rather than for cooling the now dehumidified air.

The advantage of DS technology is that humidity levels in the outside air and/or recirculated air can be adjusted independently of the subsequent cooling step. The disadvantage is the requirement to move the substrate and treated air stream relative to each other for capture and rejection of the water vapor. This requires moving a large substrate through a sealed system, or, in a parallel bed DS system, requires complicated valving and valve cycling to move the humid air stream and an exhaust stream alternately across the desiccant beds. Again, application in typical stand alone, non-ducted room-type dehumidifiers is difficult if not impossible.

U.S. Pat. No. 6,539,731 discloses another type of dehumidification technology that utilizes a porous wall separating humid air from an osmotic fluid. The porous wall includes a capillary condenser layer and an osmotic layer. The capillary condenser layer is formed from ceramic materials having pores sized small enough to permit water vapor within the air to condense into liquid form. An osmotic driving force, resulting from a water concentration gradient, transports the condensed water through the capillary condenser layer and the contiguous osmotic layer, and into the osmotic fluid. The osmotic layer prevents substantially all of the osmotic fluid from entering the capillary condenser. This type of device is effective in promoting water transport at fluxes in excess of 1 liter/square meter-hour. Under some circumstances, however, the pore structure of the capillary condenser can become unstable and degrade over a relatively short period of time in a humid environment. In addition, the capillary condenser is typically made from a rigid material and is therefore limited to those applications where a rigid body is acceptable; i.e., the rigid capillary condenser cannot be used in those applications where a flexible device is required.

What is needed is a process and an apparatus for dehumidifying a gas stream that overcomes the deficiencies of the prior art.

DISCLOSURE OF INVENTION

An object of the present invention is to provide an efficient method and means for removing water from an gas stream wherein the level of dehumidification is not interdependent with the temperature to which that gas stream may need to be ultimately cooled (for comfort or other purposes) before it is exhausted into the space being conditioned.

According to an aspect of the present invention, a process for dehumidifying a gas stream is provided that includes steps of: a) providing a semi-permeable wall having an osmotic membrane with a plurality of pores at least some of which are operably sized to permit capillary condensation, a first side, and a second side; b) placing an osmotic fluid in a compartment formed in part by the semi-permeable wall, wherein the second side of the osmotic membrane is exposed to the osmotic fluid; c) exposing the first side of the osmotic membrane to the gas stream to be dehumidified; and d) maintaining a sufficiently high water concentration gradient across the osmotic membrane during the dehumidification process to result in a flux of water through the osmotic membrane in the direction from the first side toward the second side.

According to another aspect of the present invention, an apparatus for dehumidification of a gas stream is provided. The apparatus includes at least one semi-permeable osmotic wall, at least one gas stream compartment formed in part by the osmotic wall, and at least one osmotic fluid compartment formed in part by the osmotic wall. Each semi-permeable osmotic wall has an osmotic membrane with some pores small enough to permit capillary condensation, a first side, and a second side. The first side of each osmotic membrane is exposed to the gas stream compartment, and the second side of each osmotic membrane is exposed to the osmotic fluid compartment.

In both the present invention process and apparatus, the osmotic fluid compartment is formed in part by the second side of the semi-permeable wall. In most instances, the gas stream compartment is formed in part by the first side of the semi-permeable wall. The gas stream compartment may not be a complete enclosure, and may, for example, assume the form of ducting through which the gas stream may be passed. The gas stream (e.g., high humidity outdoor air and/or recirculated indoor air) is brought into and through the gas stream compartment and passes over the first side of the osmotic membrane. Water vapor in the gas stream condenses and travels through the membrane in the direction from the first side toward the second side and into the osmotic fluid. When the water travels through the membrane, it will likely not travel exclusively in a direction perpendicular to both the first and second sides. Rather, the path through the osmotic membrane will likely include a lateral component as well as a perpendicular component. Overall, however, the path taken by the water through the membrane may be described as traveling in the direction from the first side to the second side. The now less humid gas stream exits the gas stream compartment and may then be cooled by separate air conditioning apparatus, if desired.

The semi-permeable osmotic wall typically includes a macroporous support with the osmotic membrane. The thickness of a typical semi-permeable osmotic membrane is less than 100 nanometers. The membrane comprises a plurality of pores randomly arranged across its thickness, formed by internal surface configurations within the osmotic membrane. Some of the pores are formed by surfaces positioned close enough to one another to permit capillary condensation. Our investigations lead us to believe that liquid formed within these pores connects with liquid formed in adjacent pores, collectively forming continuous paths of liquid (referred to herein as "liquid bridges"). These "liquid bridges", formed as we believe or otherwise, extend across the thickness of the semi-permeable membrane and thereby provide paths by which water can travel collectively in the direction from the first side toward the second side of the osmotic membrane. Because the membrane is so thin, water concentration gradients across the membrane can be large. This can provide a large driving force for water transport between the humid air and osmotic fluid.

In some embodiments the osmotic fluid is a solute dissolved in water, wherein the solute has a high ion (e.g., a salt) concentration, and the osmotic layer is a membrane permeable to water, but not to ions in solution. The choice of solute and any other additives making up the osmotic fluid will be determined by the transport properties through the membrane. For example, the solute and the osmotic membrane are selected such that the size of the hydrated solute molecules is greater than the pore size of the osmotic membrane in order to prevent the solute from flowing through the osmotic membrane toward the humid air. The solute is also selected to ensure that the molecules of solute do not lodge within and thereby block the pores of the semi-permeable osmotic membrane. To assure that the condensed water flows from the semi-permeable membrane into the osmotic fluid, a high concentration of solute is maintained in the osmotic fluid to maintain a high water concentration gradient across the membrane.

In some embodiments, the osmotic fluid is one that is miscible with water at all concentrations, such as glycerol or ethylene glycol. Here the fluid can be maintained at a low water concentration in order to maximize the osmotic flux. Typical membranes have permeabilities for glycerol which are about one thousand times less than for water. However, some reverse transport may occur.

In some cases, a biocidal component may be added to the osmotic fluid in conjunction with a solute chosen for maximum flux through the membrane. The biocidal component is selected to prevent microbial growth or biofouling on surfaces which would naturally occur in an aqueous environment and eventually block the membrane or pores. Examples of biocidal or bacteristatic additives that can exist in osmotic fluid as ionic species include silver and copper. In addition to these simple ionic antimicrobial agents, small concentration of larger molecules such as quaternary amines, or gluteraldehydes may be used. Gluteraldehyde is an example of a sterilant and disinfectant that is less corrosive than most other chemicals and does not damage plastics. Bleach (e.g., hypochlorous acid), for example, is antimicrobial but accelerates corrosion and would not be a preferred additive to the osmotic fluid.

The high solute concentration of the osmotic fluid may be maintained in several different ways, including: 1) excess water may be evaporated or otherwise removed from the fluid; 2) the solute may be replenished at appropriate times or intervals; and/or 3) the fluid may be provided with excess solute (undissolved) that dissolves automatically when the concentration of water in the osmotic fluid exceeds the amount needed to have the water fully saturated by the solute. Other techniques or a combination of techniques may also be used to maintain a high solute concentration.

The dehumidification apparatus preferably, however, includes means for regenerating the osmotic fluid to maintain a high concentration of solute in the osmotic fluid, and thus to maintain the high water concentration gradient across the osmotic layer during operation of the apparatus. The regenerating means may, for example, include apparatus operable to evaporate, either continuously or as needed, excess water from the osmotic fluid.

One of the primary benefits of the present invention is that the humidity of the incoming air may be controlled independently of the temperature. The water may be condensed out of the incoming humid gas stream, taking advantage of the ability of the osmotic wall to rapidly and efficiently remove water vapor without the need to remove sensible heat from the air stream (i.e., the moisture may be removed from the gas stream at ambient temperatures). The water condensed in the osmotic membrane is caused to move into the osmotic fluid by maintaining a water concentration gradient across the membrane. The water concentration gradient across the osmotic membrane is created and maintained by having a sufficiently low concentration of water (i.e., a high concentration of solute or miscible fluid) within the osmotic fluid. If the water vapor removed from the air is rejected to an exhaust area not in contact with the treated air, the now dehumidified gas stream may then be cooled to any desired temperature by appropriate means, such as by using a standard air conditioning cycle. The incoming air stream is thus made more comfortable by separately controlling both its humidity and temperature.

Another advantage provided by the present invention is that a gas stream can be dehumidified using less energy than is required using prior art methods. For example, re-evaporation power requirements for the present invention are lower than if the water were to be removed from the system by, for example, reheating a desiccant bed. This is because the osmotic fluid serves as a latent energy buffer for the captured water vapor (i.e., the heat of condensation released when water vapor condenses is buffered by the osmotic fluid). While it may be necessary or desirable to use an energy source to assist in the removal (e.g., by separation or re-evaporation) of the excess water from the osmotic fluid, the process can be relatively simple and energy efficient compared, for example, to the analogous step of a DS cycle wherein a bed of desiccant is usually taken off line and heated.

The present invention process and apparatus has the additional advantage of few moving parts and prolonged dehumidification capability. Even though the accumulated reject water must eventually be removed and energy must be expended, operation of the device may be continued for prolonged periods without such water removal. The reason this is permissible is that the water need not be separated or re-evaporated at the same rate or at the same time at which is it produced. If the water is directed outside, or where a lower humidity waste stream is present, or preferably where a source of waste heat is present (such as the condenser or compressor of an air conditioning system), the water may gradually evaporate with no additional work to be done by the system.

Yet another advantage of the present invention is that a method and means for dehumidifying a gas stream is provided that can be used with unusual contours, such as the ducts of air handling equipment, the panels of cars, trucks, and ships as well as the walls of homes and office buildings, the clothing of hikers and of physicians in an operating room, and the bed linen of people who sleep in a humid environment. A membrane can be molded to the contour of a boundary of a volume to be dehumidified, with an osmotic solution contained in a space adjacent to it. The present osmotic wall is also capable of configurations within a rigid or flexible compartment, wherein the wall is folded or otherwise arranged to provide an amount of surface area that is significantly greater than, for example, a planar wall extending across a compartment. As a result, the overall flux through the osmotic wall is enhanced significantly.

These and other objects, features, and advantages of the present invention method and apparatus will become apparent in light of the detailed description of the invention provided below and the accompanying drawings. The methodology and apparatus described below constitute a preferred embodiment of the underlying invention and do not, therefore, constitute all aspects of the invention that will or may become apparent by one of skill in the art after consideration of the invention disclosed overall herein.

BEST MODE FOR CARRYING OUT THE INVENTION

Figure 1:
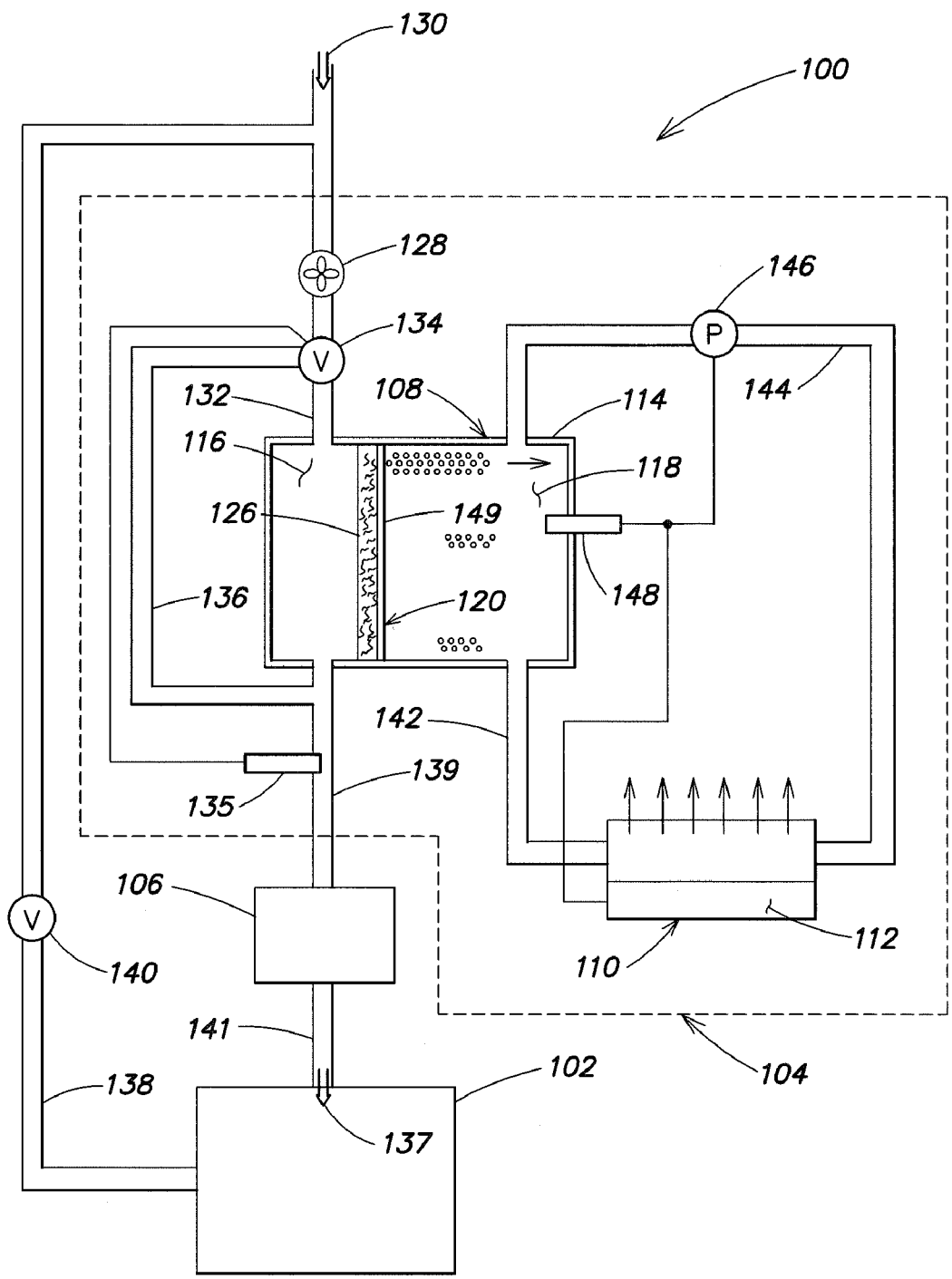
FIG. 1 is a schematic view of an air conditioning system incorporating features of an embodiment of the present invention.
Figure 2:
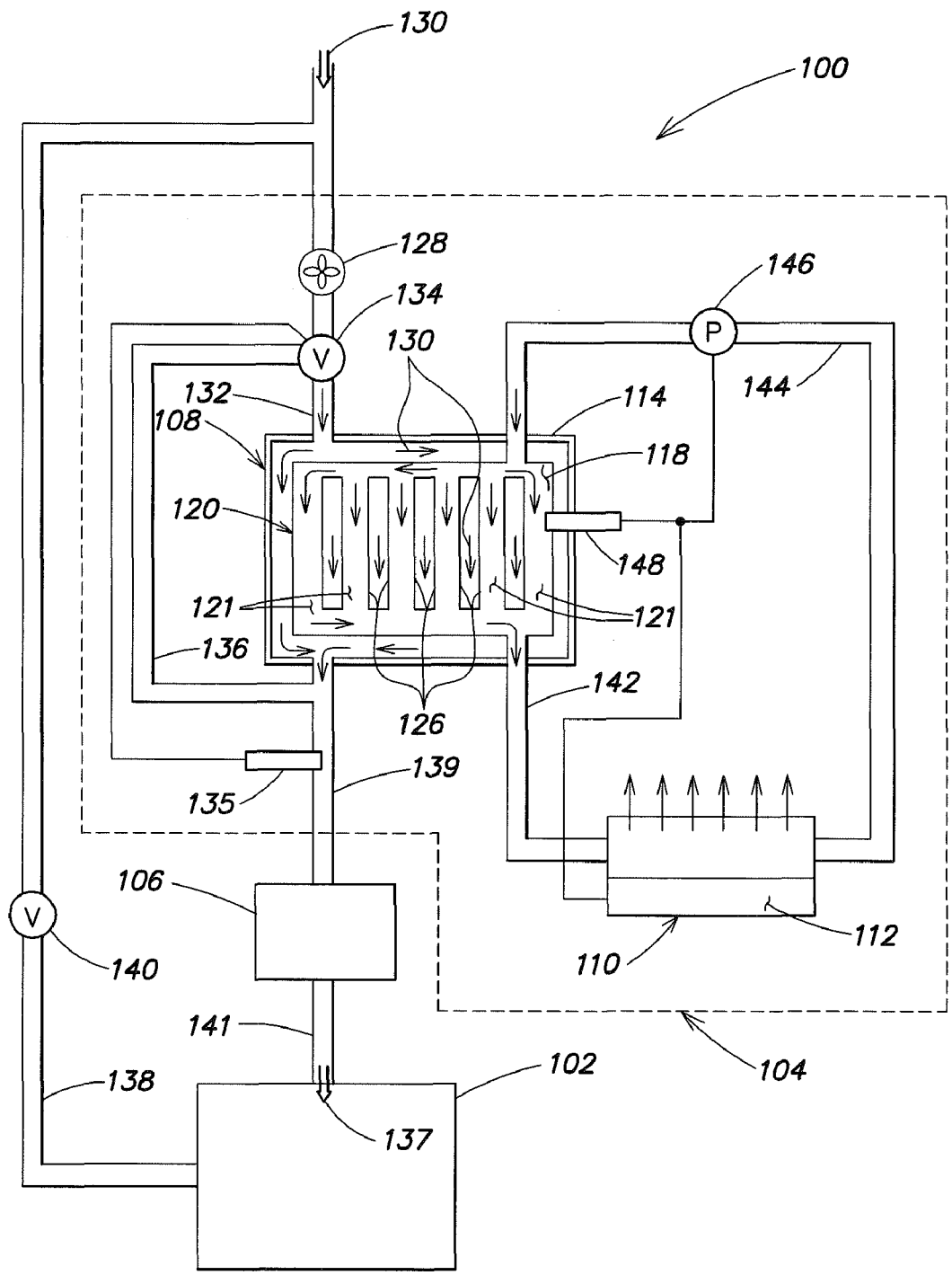
FIG. 2 is a schematic view of an air conditioning system incorporating features of an embodiment of the present invention.

FIGS. 1 and 2 schematically depict an air conditioning system 100 for conditioning the gas (e.g., air) within an enclosed space 102. The system 100 includes dehumidification apparatus 104 (represented by the components within the dotted line) and cooling apparatus 106. The dehumidification apparatus includes a dehumidifier 108 and an evaporator 110. In this embodiment the evaporator includes an auxiliary heater 112. The dehumidifier 108 is schematically depicted as an enclosure 114 divided into an airflow compartment 116 and an osmotic fluid compartment 118. The compartment 118 contains an osmotic fluid, which is water with a solute dissolved therein. The compartments 116, 118 are separated by a semi-permeable osmotic wall 120 comprising an osmotic membrane 126 as will be described below.

Before providing a more detailed description of the properties and characteristics of the semi-permeable osmotic wall and osmotic fluid, and the interrelationships between them, it is helpful to first have a general understanding of the overall operation of the air conditioning system 100 within which they are incorporated.

The system 100 typically operates as follows: A fan 128 or other suitable airflow generator pulls humid outside air represented by the arrow 130, into an inlet duct 132 and blows it into and through the airflow compartment 116. A valve 134 within the duct 132 may direct all, some or none of that air around the dehumidifier through a bypass duct 136, depending upon dehumidification requirements. In this schematic representation, the valve 134 is controlled based upon a signal from a sensor 135 which measures the humidity of the air stream as it leaves the dehumidifier 108.

As the air passes through the compartment 116, water vapor in the air condenses into liquid form within the pores of the osmotic membrane 126. The water subsequently travels through the osmotic membrane 126 into the osmotic fluid within the compartment 118. The air, now lower in humidity, leaves the air flow compartment 116 through a duct 139 and is directed into the cooling apparatus 106, which may be of any desired type. The cooling apparatus 106 cools the air, if necessary or desired, and exhausts it via a duct 141 into the enclosed space 102 being conditioned, as depicted by the arrow 137. Part of that cooled and dehumidified air may be recirculated through the dehumidifier and cooling apparatus, such as by returning a portion of it, via a duct 138, to the inlet duct 132, to be mixed with incoming outside air 130. A valve 140, or the like, controls the amount of air recirculated, and may be responsive to any number of parameters, such as the humidity and/or temperature of either or both the outside air 130 and air within the space 102. Although not shown in FIG. 1, the conditioned air within the space 102 may also be recirculated through only the cooling apparatus if dehumidification is not needed.

Further regarding operation of the system 100, the osmotic solution leaves the compartment 118 via a duct 142, passes through the evaporator 110, and is returned to the compartment 118 via a duct 144. As stated above, an evaporator 110 is an example of a means for regenerating the osmotic fluid, and the present invention is not limited to use with an evaporator 110. In the evaporator 110, water within the osmotic fluid evaporates into the atmosphere at a rate selected to maintain a desired water concentration within the osmotic fluid in the compartment 118. As shown in FIG. 1, an auxiliary heater 112 and a pump 146 within the duct 142 can be used to affect the rate of evaporation. Their operation is controlled by a signal from a sensor 148 that monitors the water concentration of the osmotic fluid within the compartment 118. The auxiliary heat needed to vaporize water in the evaporator 110 may be the waste heat from the cooling apparatus 106, although this heat transfer is not shown in FIG. 1.

An alternate method for maintaining the proper water concentration in the osmotic fluid is to direct the osmotic fluid from the compartment 118 into a large surface area overflow pan exposed to the outside air. Fresh osmotic fluid with an appropriate water concentration would be pumped into the compartment, as needed.

The semi-permeable osmotic wall 120 typically includes a macroporous structure 149 that provides support to the osmotic membrane 126. The macroporous structure 149 may comprise the same material as the osmotic membrane 126, a different material, or some combination thereof. The macroporous structure 149 may be disposed on one or both sides of the osmotic membrane 126, or be integral with the osmotic membrane 126. The macroporous structure 149 is typically porous, having cells, pores, or the like that permits water vapor to access the first side of the osmotic membrane 126 and/or osmotic fluid to access the second side of the osmotic membrane 126, depending on the particular macroporous structure 149 used and its position relative to the osmotic membrane 126. FIG. 1 schematically shows the macroporous structure on the second side of the osmotic membrane 126 for illustrative purposes.

The osmotic membrane 126 is a hydrophilic membrane having a thickness typically in the range of between about five (5) nanometers and one hundred (100) nanometers. The thinner the membrane 126, the greater the water flux through the membrane 126 and into the osmotic fluid, since flux across the osmotic membrane 126 is inversely proportional to the thickness of the osmotic membrane 126. Due to the large Gibbs Free Energy drive across the osmotic membrane 126 exerted by the osmotic fluid, the pore morphology of the osmotic membrane 126 allows water transfer through the osmotic membrane 126 and into the osmotic fluid compartment 118. That is because the water condensed in the pores of the osmotic membrane 126 is water in the pure liquid state, and the osmotic fluid is chosen to have a high concentration of solute. The osmotic fluid exerts a type of osmotic "pressure" on the condensed pure water. The magnitude of the osmotic pressure is described by the Van't Hoff equation, while the osmotic pressure gradient is in direct proportion to this magnitude and indirectly proportional to the thickness of the osmotic membrane 126.

The preferred pore size for the osmotic membrane 126 will depend upon the nature of the solute used in the osmotic fluid. As mentioned above, the pores should not be so large that the hydrated solute molecules can pass through them or enter and block the pores. Pore diameters (i.e., separation distances between membrane internal surfaces) on the order of about ten to twenty Angstroms (10-20 Å) would be acceptable for use with most osmotic fluids. If a salt solution is used as the osmotic fluid, pore diameters of between about five to ten Angstrom (5-10 Å) are preferred. The water flux across the osmotic membrane 126 is a function of the membrane's permeability and the water concentration difference across the osmotic membrane 126. Flux equals the product of permeability, cross sectional area, and concentration difference across the membrane 126. The permeability is inversely proportional to the membrane 126 thickness.

The osmotic membrane 126 of the present invention is preferably made from synthetic materials, including, but not limited to synthetic polymers. Cellulose acetate and polyamide are examples of acceptable synthetic polymers.

The dehumidifier 108, and more specifically the osmotic wall 120, the airflow compartment 116, and the osmotic fluid compartment 118, can assume a variety of different configurations. As shown schematically in FIG. 1, the osmotic wall 120 may be disposed within a box-like enclosure, separating the airflow compartment 116 and the osmotic fluid compartment 118. An alternative arrangement schematically shown in FIG. 2 includes an array of osmotic walls 120 in the form of cylindrical tubes 121, wherein humid air 130 flows around and between the tubes 121 and osmotic fluid flows through the tubes 121. Alternatively, the humid air may flow through the tubes 121 and the osmotic fluid may be disposed outside the tubes. Further alternative arrangements include flexible planar osmotic walls, flexible osmotic walls folded into configurations (e.g., non-random arrangements such as bellows and corrugations, or a randomly folded bunch-type arrangement) that increase the surface area of the osmotic wall extending between the airflow compartment 116 and the osmotic fluid compartment 118. The embodiment shown in FIG. 1, for example, includes a planar osmotic wall having a particular surface area. Additional osmotic wall surface area can be provided in the embodiment of FIG. 1 by utilizing an osmotic wall having a folded configuration rather than the planar configuration shown. The increased surface area of the folded configuration can permit a greater flow through the osmotic wall in a given time period. As stated above, such flexible arrangements may provide considerable utility in applications such as the clothing of hikers and of physicians in an operating room, and the bed linen of people who sleep in a humid environment. In still further alternative arrangements, the osmotic wall 120 may be molded to the contour of a boundary of a volume to be dehumidified, with an osmotic fluid contained in a space adjacent to it.

An osmotic fluid having solute molecules that: 1) do not permeate the osmotic membrane 126 in a dehydrated and/or a hydrated state; 2) have high solubility in water; and 3) do not degrade the osmotic membrane 126, is an example of an acceptable osmotic fluid. Osmotic fluids may be either ionic solutions or nonionic solutions. Nonaqueous solutions may also be used. Examples of osmotic fluids are lithium and magnesium salt solutions and phosphate salt solutions, although other salts may be used. Examples of two non-aqueous osmotic fluid solutions are glycerol and ethylene glycol.

In the foregoing description, methods are described for maintaining a high water concentration gradient across the osmotic membrane 126 that involve either evaporating excess water or to adding fresh osmotic fluid to the osmotic fluid compartment 118. In a further embodiment the osmotic fluid intentionally includes solute in excess of the saturation limit. Thus, initially, solute crystals will be present in the osmotic fluid. As water passes through the osmotic membrane 126 and into the osmotic fluid, more solute will dissolve, due to the presence of the additional water; and thus the concentration of solute in solution will remain at the highest level, i.e., saturation. Eventually, when all the undissolved solute crystals dissolve and even more water enters the osmotic fluid, the concentration of solute will gradually decrease and the osmotic driving force will decrease, thereby reducing the amount of water transported through the osmotic membrane 126. At this point, the water must be removed and the osmotic solution reconcentrated.

Examples of commercially available materials that can be used to form the osmotic membrane 126 include "Polyamide RO AK Membrane" and "Thin Film NF HL Membrane" both of which are manufactured by GE Osmonics, and marketed by Sterlitech Corporation of Kent, Wash., U.S.A. for purification of brackish water by reverse osmosis. Other commercially available materials that can be used to form the osmotic membrane 126 include "X-Pack" and "Expedition" marketed by Hydration Technologies, Inc. of Albany, Oreg., U.S.A. for purification of water by forward osmosis.

Figure 3:
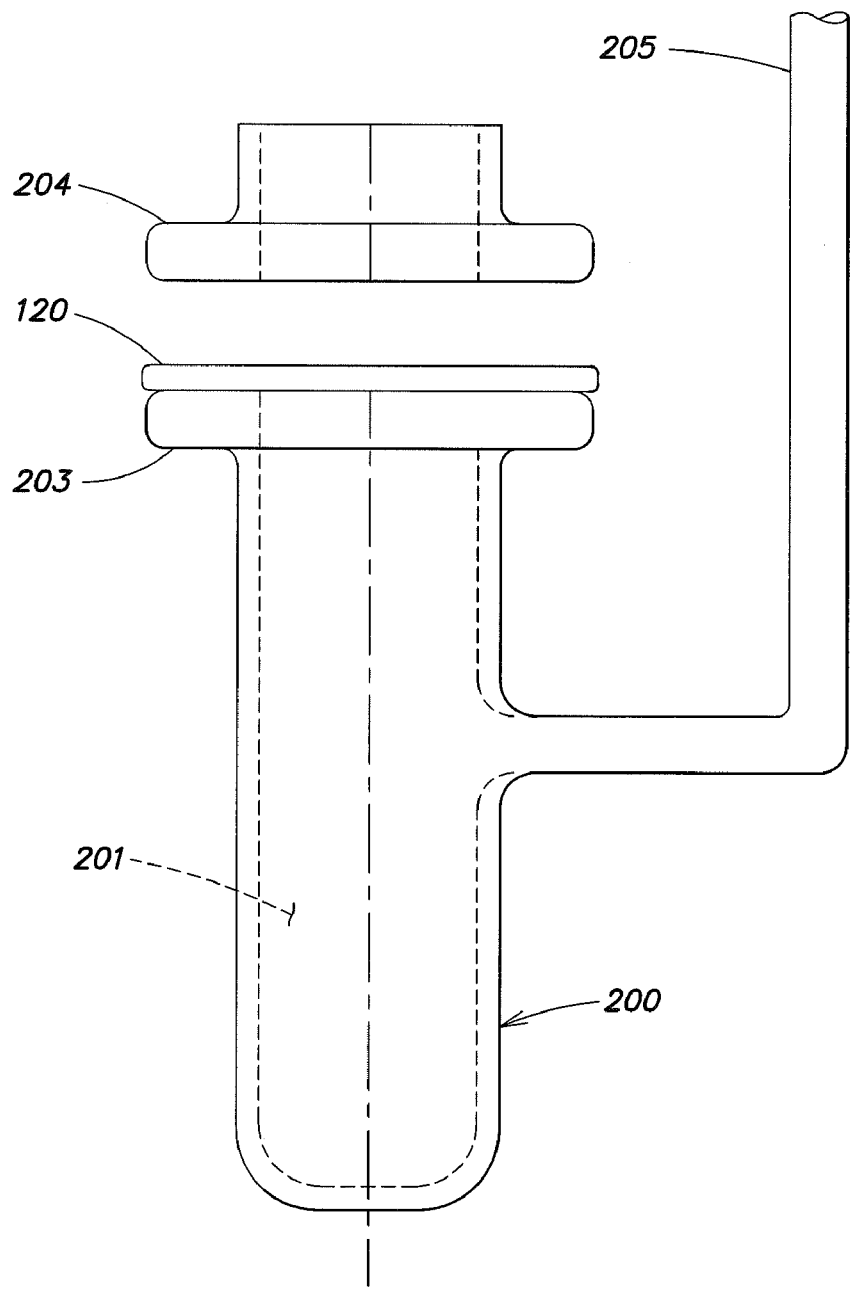
FIG. 3 is a schematic exploded view of an apparatus constructed in accordance with the teachings of the present invention.

Now referring to FIG. 3, to illustrate the dehumidification process of the present invention, the internal volume 201 of a 100 ml vessel 200 was filled with an osmotic solution comprising saturated aqueous solution of lithium chloride. A number of different osmotic walls 120, each approximately five centimeters (5 cm) in diameter, were individually disposed between the top lip 203 of the vessel and a compartment 204 open to the air on top of the top lip 203. A tube 205 extending from the vessel 200 is used to measure the rate of increase of water to the vessel 200. Humid air at relative humidity between about 70% and 90% was blown over the top of the vessel 200 and the change in liquid level in the tube 205 was measured as a function of time for each wall 120. The osmotic fluid was mixed with the incoming water using a magnetic mixer at the bottom of the vessel 200. The results are indicated in the table below:

| OSMOTIC MEMBRANE | WATER FLUX (liters/square meter-hour) |
| --- | --- |
| Polyamide RO AK | 0.28 |
| Thin Film NF HL | 0.30 |
| X-Pack | 0.60 |
| Expedition | 0.80 |

From these experiments it was apparent that capillary condensation occurs in regions of small pore size in each semi-permeable osmotic wall 120, and that water traveled across the thickness of the osmotic wall 120 likely via water bridges formed across the thickness of the wall 120. Each osmotic wall 120 maintained a high water concentration gradient by not allowing significant permeation of the osmotic fluid in the direction of the humid air, thereby resulting in water being driven through the osmotic wall 120 and into the osmotic fluid. It is believed that the various osmotic walls 120 exhibited different water fluxes because of their different thicknesses and permeabilities. These characteristics would influence the water bridges linking the liquid traveling across the walls 120 and into the osmotic fluid, and therefore the water flux rate.

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. An apparatus for dehumidification of a gas stream, comprising:
   a single semi-permeable hydrophilic osmotic membrane, which membrane comprises randomly arranged pores disposed across a thickness extending between a first side and a second side, and wherein some of the pores are small enough to permit capillary condensation within the membrane, leading to condensate travel across the thickness of the single membrane without requiring a separate capillary condenser, and which single membrane restricts transport of an osmotic fluid across the thickness of the membrane;
   at least one gas stream compartment through which the gas stream may flow, formed in part by the osmotic membrane, wherein the first side of the osmotic membrane is positioned so as to be exposed to the gas stream within the gas stream compartment;
   at least one osmotic fluid compartment formed in part by the osmotic membrane, wherein the second side of the osmotic membrane is contiguous with the osmotic fluid compartment; and
   an osmotic fluid regenerator.

2. A process for dehumidifying a gas stream, comprising the steps of:
   providing an osmotic fluid;
   providing a single semi-permeable hydrophilic osmotic membrane, which membrane comprises randomly arranged pores disposed across a thickness extending between a first side and a second side, and wherein some of the pores are small enough to permit capillary condensation within the membrane, leading to condensate travel across the thickness of the single membrane without requiring a separate capillary condenser, and which single membrane restricts transport of the osmotic fluid across the thickness of the membrane;
   placing the osmotic fluid in a compartment formed in part by the semi-permeable membrane, wherein the second side of the osmotic membrane is exposed to the osmotic fluid;
   exposing the first side of the osmotic membrane to the gas stream to be dehumidified;
   maintaining a sufficiently high water concentration gradient across the osmotic membrane during the dehumidification process to result in a flux of water through the osmotic membrane; and
   regenerating the osmotic fluid to maintain a high concentration of solute in the osmotic fluid.

3. The process of claim 2, wherein the step of regenerating the osmotic fluid includes the step of evaporating excess water from the osmotic fluid.

4. The process of claim 2, wherein the step of regenerating the osmotic fluid includes the step of adding solute to the osmotic fluid.

* * * * *